J. L. WILLFORD.
PERCENTAGE FEEDER.
APPLICATION FILED JUNE 16, 1919.

1,364,168.

Patented Jan. 4, 1921.
3 SHEETS—SHEET 2.

INVENTOR
Joseph L. Willford
BY HIS ATTORNEYS

J. L. WILLFORD.
PERCENTAGE FEEDER.
APPLICATION FILED JUNE 16, 1919.

1,364,168.

Patented Jan. 4, 1921.
3 SHEETS—SHEET 3.

INVENTOR
Joseph L. Willford
BY HIS ATTORNEYS

UNITED STATES PATENT OFFICE.

JOSEPH L. WILLFORD, OF MINNEAPOLIS, MINNESOTA.

PERCENTAGE FEEDER.

1,364,168.   Specification of Letters Patent.   Patented Jan. 4, 1921.

Application filed June 16, 1919. Serial No. 304,390.

*To all whom it may concern:*

Be it known that I, JOSEPH L. WILLFORD, a citizen of the United States, residing at Minneapolis, in the county of Hennepin and State of Minnesota, have invented certain new and useful Improvements in Percentage Feeders; and I do hereby declare the following to be a full, clear, and exact description of the invention, such as will enable others skilled in the art to which it appertains to make and use the same.

My present invention has for its object to provide a simple and highly efficient adjustable feeder for variably feeding dry, granular, powdered, or coarser so-called free flowing materials, such for example, as grain, flour, or the intermediate stocks. These adjustable feeders are especially adapted to be coupled up in a gang, usually designated as proportional feeders, and adapted for feeding various different materials in predetermined proportions in the blending thereof. Such proportional feeders are adapted for the mixing of different flours, grains, or the food stocks made from grains, but are capable of much more general use.

One of the main objects had in view is a machine or mechanism of small size which will have very great capacity for handling large quantitiese of material during a comparatively short interval of time; and the present machine fully meets this condition, as well as others which will hereinafter appear.

In the accompanying drawings which illustrate the invention, like characters indicate like parts throughout the several views.

Referring to the drawings.

Figure 1:
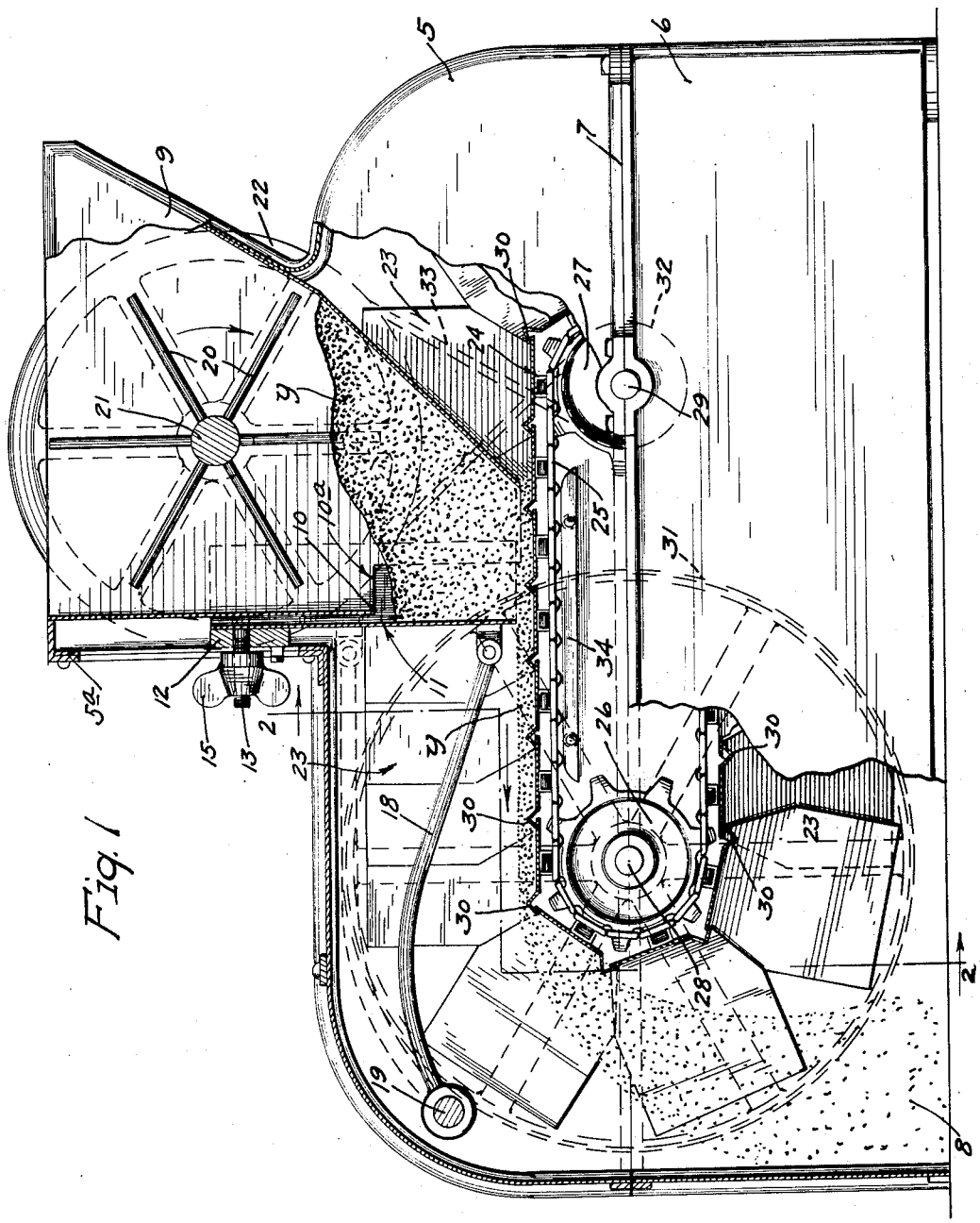
Figure 1 is a side elevation of the improved feeder with some parts broken away and some parts sectioned on the line 1—1 of Fig. 2.
Figure 2:
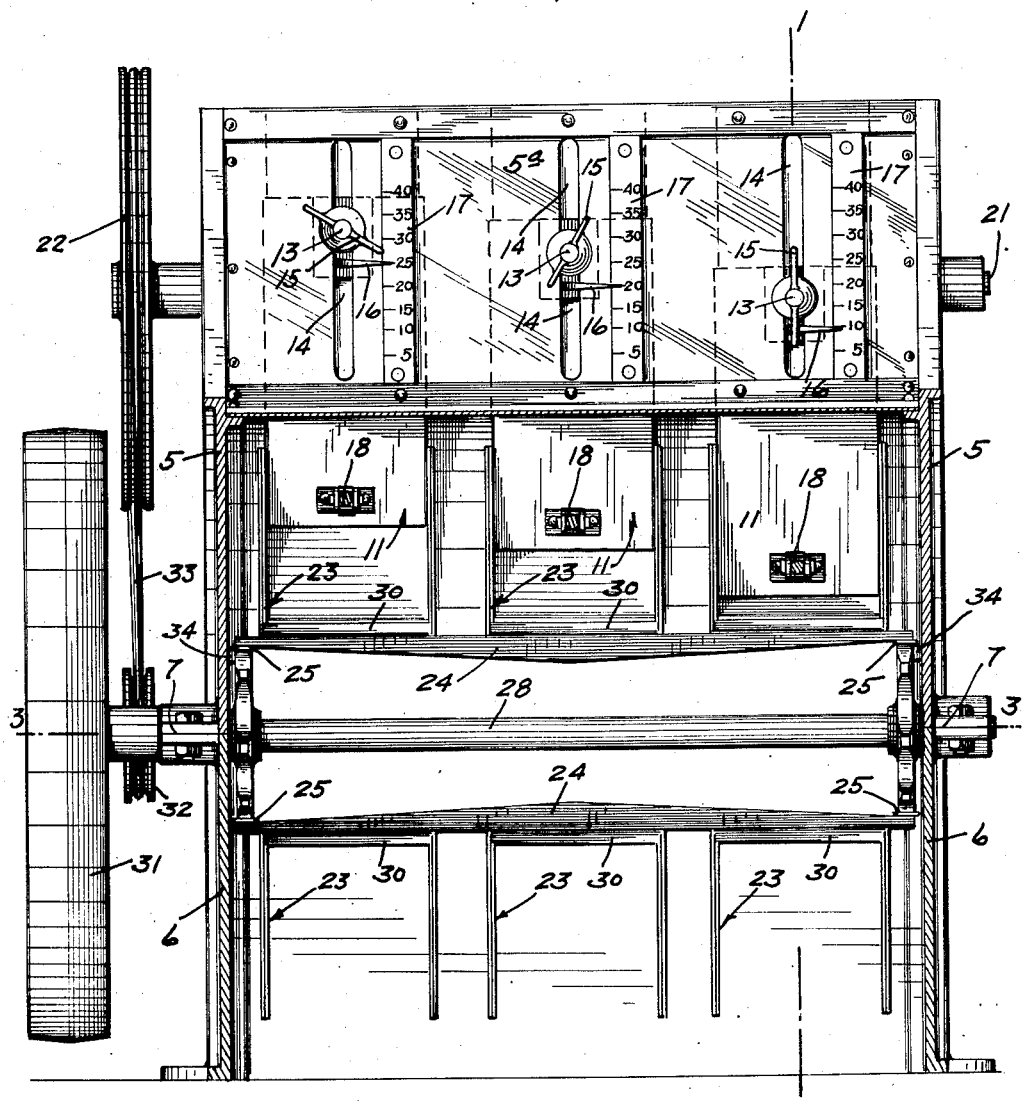
Fig. 2 is a vertical section taken approximately on the line 2—2 of Fig. 1.

The inclosing case of the feeder is preferably made up of an upper section 5 and a lower section 6, some parts being united at a horizontal joint 7. The base section 6 has a discharge passage at 8 and the upper section 5 is formed with a hopper 9 that is open at its top to receive the stock or free flowing dry material $y$.

In fact, the present machine, being designed for the simultaneous feeding of several materials to be blended, is shown as provided with three such hoppers 9. These hoppers 9 are laterally spaced and they extend down into the upper case section 5 and their contracted bottoms are open. Furthermore, for an important purpose which will presently appear, the hoppers 9, at their delivery sides, are cut away from the bottoms of the hoppers on the points marked 10 and are cut away on the sides on lines $10^a$ to points considerably at the rear of the said delivery sides of the hoppers.

For each hopper there is a vertically adjustable gate 11 that is channel-shaped in horizontal cross section so that their vertical side flanges overlap the sides of the hoppers and span the gaps cut in the sides of the hoppers at 10—$10^a$. At their upper portions, the gates 11 are shown as independently secured to head bars 12 having projecting threaded studs 13 that work through slots 14 in the front plate $5^a$ of the upper case section 5. Nuts 15 on the ends of the studs 13 overlap the slots 14 and clamp plate $5^a$ to securely, but adjustably hold the gates in different vertical adjustments. The head bars 12 are shown as provided with position indicating fingers or pointers 16 that coöperate with scales 17 secured adjacent to the respective slots 14.

The lower portions of the gates 11 are pivoted to the rear ends of thrust rods 18, which, at their front ends, are pivoted on a transverse rod 19 secured to the sides of the case section 5 and extended through the case on a line near the upper front portion thereof.

Working rotatively in each hopper 9 there is an agitator made up of radial rods 20 and a shaft 21, which shaft is common to the several agitators, is extended through the several hoppers, is suitably journaled in the sides of the same, and provided at one end with a pulley, preferably in the form of a grooved sheave 22.

Figure 3:
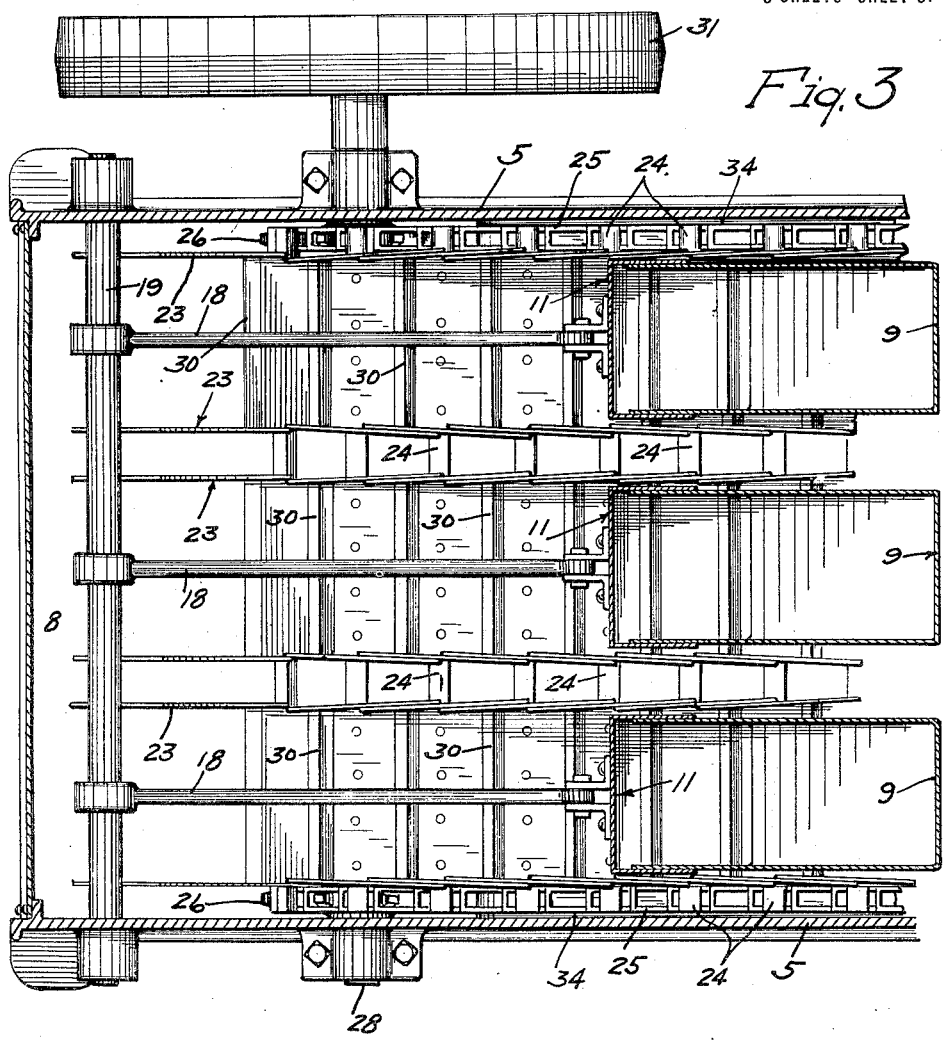
Fig. 3 is a horizontal section taken approximately on the line 3—3 of Fig. 2.
Figure 4:
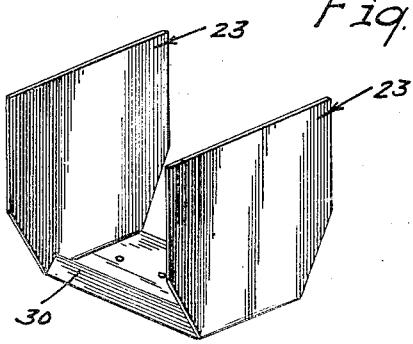
Fig. 4 is a perspective view of one of the endless traveling feed trough sections.

The several hoppers, at their open bottoms, deliver independently onto the upper horizontal portions of endless so-called driving feed troughs, the laterally spaced upstanding sectional flanges of which work on opposite sides of the depending portions of the respective hoppers. Each feed trough is made up of a plurality of U-shaped sections 23 preferably formed from flat sheet metal with the sections in overlapping arrangement. The corresponding laterally opposite trough sections 23 of the several troughs are, at their bottoms, bolted, riveted, or otherwise rigidly secured to common transverse carrying slats or bars 24, which, at their ends, are secured to certain of the links of a pair of laterally spaced parallel link belts 25. These link belts 25 run over front and rear sprockets 26 and 27 secured in pairs, respectively, on transverse shafts 28 and 29 journaled in suitable bearings formed on the sides of the casing 5—6 at the joint line 7. By reference particularly to Fig. 3, it will be noted that the upstanding side flanges of the trough sections 23 flare slightly in a forward direction, so that they will nest or overlap when all of the sections are made of identically the same form. The bottom of the said sections 23 also overlap, and for an important reason, the bottom of each side section, at its front edge, is formed with a corrugation 30, preferably of V-shape cross-section.

The front shaft 28 projects at one end and is provided with a pulley 31 over which a power-driven belt, not shown, is adapted to run to transmit motion to the running parts of the feeder. Rear shaft 28, at one end, is provided with a small grooved pulley 32 that is alined with the larger groove pulley 22. A cross belt 33 runs over the pulleys 32 and 22 to transmit motion to the agitator shaft 21. The upper rungs of the belt chains 25 are preferably arranged to run over skid bars 34 secured to the sides of the case section 5 and serve to hold the upper portions of the trough-like belts for true horizontal movements as they pass under the respective hoppers.

The several trough-like feed belts travel at the same speed, and by the proper vertical adjustments of the gates 11, the several feeding devices may be set to feed any desired proportionate amount. To illustrate, let H represent height in inches of discharge opening, or distance of lower edge of gate from bottom of underlying feed trough sections; let W represent width, in inches, of said opening; and let T represent distance, in inches, traveled by the feed belt in one minute. Then, the amount of material in cubic inches fed from the hopper per minute will be determined by the formula H×W×T. Here it may be stated that the scales 17 are preferably graduated in units marked to indicate the amount of material which, in accordance with the above formula, will be fed from the respective hopper.

If the said scales are to indicate the exact amount in cubic inches per unit of time, then the movement of the sectional feed troughs must be that assumed to be represented by T; but in any event, the scales will indicate a proportionate amount that will be fed by the several feed troughs, regardless of speed per unit of minute, since all of the said troughs must, in the arrangement described, move at the same speed.

The agitators keep the material in the hoppers stirred up so that it cannot clog at the discharge opening. For very free flowing materials, these agitators might not be required.

The material in the hoppers will always bear upon the underlying portions of the respective feed troughs. These feed troughs move in the direction of the arrow marked adjacent thereto on Fig. 1, and in view of the notches 10ª cut in the sides of the hoppers adjacent to the side flanges of the gates, the stock will be free to flow under the lower edges of the side flanges of said gates and into contact with the moving upstanding side flanges of the trough sections so that the frictional contact therewith will draw the stock from the hopper and insure the intended discharge of stock from the hopper determined by the adjustments of the gates. The upper edges of the upturned flanges of the trough sections, it will be noted, are slightly above the upper edges of the said notches 10ª, so that there never can be an overflowing of the stock even when the gates are raised to their greatest height.

With the above arrangement, no variation in the speed of any of the running parts is required to give the various different proportionate feeding, but such variation is taken care of entirely by adjustments of the gates which regulate the height of the stock that can flow with the belt under the gates.

The thrust rods 18 permit free movements of the gates but prevent the gates from being forced forward out of position by the considerable pressure produced thereon by the stock in the hopper under the movement of the coöperating traveling sectional trough.

By reference to Fig. 1, it will be noted that as the sections of the trough move around, and the shafts 28 discharge their loads, the rear edges of the bottoms of the trough sections move upward into the V-shaped corrugations of the trough sections next at the rear, and all the time maintain close joints which will prevent leakage of grain or stock through the bottom of the sectional trough. This is also accomplished without producing binding movements between the trough sections.

The streams of grain or stock delivered from the several hoppers by the coöperating traveling troughs will all be delivered through the discharge opening 8 of the casing and may be commingled and mixed by any suitable means. The several streams may, for example, be caught and carried by a common conveyer.

What I claim is:

1. The combination with a traveling sectional feed trough, of a feed hopper extended downward into the upper portion of said trough and having an opening in its bottom for delivering the stock directly onto said trough, said hopper being provided with a vertically adjustable gate at its delivery side, and a thrust link pivoted to the lower portion of said gate and to a relatively fixed support that is located forward of said gate.

2. The combination with parallel shafts, each having a pair of driving wheels, of laterally spaced parallel belts running over the alined wheels of said two shafts, cross slats connecting said belts at intervals, a plurality of endless sectional feed troughs made up of lapping sections secured to said slats, and individual hoppers extending into the upper portions of the respective feed troughs and arranged to independently deliver thereto.

3. The combination with parallel shafts, each having a pair of driving wheels, of laterally spaced parallel belts running over the alined wheels of said two shafts, cross slats connecting said belts at intervals, a plurality of endless sectional feed troughs made up of lapping sections secured to said slats, and individual hoppers extending into the upper portions of the respective feed troughs and arranged to independently deliver thereto, said hoppers having independently vertically adjustable gates at their delivery sides.

4. The combination with a traveling endless sectional feed trough, of an open bottom hopper extended downward into said sectional trough, said hopper being cut away at its front and part way back on its sides, and a vertically adjustable gate applied to the front side of said hopper and having flanges that overlap the sides of said hopper beyond the cut-away side portions thereof.

5. The combination with a traveling endless sectional feed trough, of an open bottom hopper extended downward into said sectional trough, said hopper being cut away at its front and part way back on its sides, and a vertically adjustable gate applied to the front side of said hopper and having flanges that overlap the sides of said hopper beyond the cut-away side portions thereof, the front and side openings thus formed in the said hopper for coöperation with said gate being entirely below the upper edges of the upper sections of said feed trough.

In testimony whereof I affix my signature in presence of two witnesses.

JOSEPH L. WILLFORD.

Witnesses:
BERNICE G. BAUMANN,
HARRY D. KILGORE.